(12) United States Patent
Friedberger et al.

(10) Patent No.: US 11,999,246 B2
(45) Date of Patent: Jun. 4, 2024

(54) ELECTRICAL ENERGY STORAGE SYSTEM AND A VEHICLE COMPRISING SUCH AN ELECTRICAL ENERGY STORAGE SYSTEM

(71) Applicant: Airbus (S.A.S.), Blagnac (FR)

(72) Inventors: Alois Friedberger, Oberpframmern (DE); Stephan Friedl, Bad Wiessee (DE)

(73) Assignee: Airbus (S.A.S.), Blagnac (FR)

( * ) Notice: Subject to any disclaimer, the term of this patent is extended or adjusted under 35 U.S.C. 154(b) by 0 days.

(21) Appl. No.: 18/082,680

(22) Filed: Dec. 16, 2022

(65) Prior Publication Data

US 2023/0191924 A1 Jun. 22, 2023

(30) Foreign Application Priority Data

Dec. 17, 2021 (EP) ..................................... 21215598

(51) Int. Cl.
*B60L 50/70* (2019.01)
*B60L 3/00* (2019.01)
(Continued)

(52) U.S. Cl.
CPC ............. *B60L 50/70* (2019.02); *B60L 3/0046* (2013.01); *B60L 58/30* (2019.02);
(Continued)

(58) Field of Classification Search
None
See application file for complete search history.

(56) References Cited

U.S. PATENT DOCUMENTS

2008/0280192 A1* 11/2008 Drozdz ................. B60L 3/0046
700/297
2015/0110155 A1* 4/2015 Turgeon .............. H01M 50/505
429/90

(Continued)

FOREIGN PATENT DOCUMENTS

DE 10 2019 205953 A1 10/2020
EP 3 176 851 A1 6/2016

OTHER PUBLICATIONS

European Search Report for Application No. 21215598 dated Jul. 7, 2022.

*Primary Examiner* — Jared Fureman
*Assistant Examiner* — Joel Barnett
(74) *Attorney, Agent, or Firm* — KDW Firm PLLC

(57) ABSTRACT

An electrical energy storage system includes electrochemical energy storage cells for collecting, supplying and storing electrical energy, a contacting device for contacting the energy storage cells, and temperature sensors for monitoring temperature of individual energy storage cells. The electrochemical energy storage cells include a first and second electrical terminal, the contacting device including conductors. A first contacting element connects the first electrical terminal of each cell and a first conductor of the contacting device. A second contacting element connects the second electrical terminal of each cell and a second conductor of the contacting device. The temperature sensors include a thermocouple having a first element from a first metal material and a second element from a second metal material. The first element is connected to one of the terminals or the body of the energy storage cell and the second element is connected to the first element or the body of the energy storage cell.

14 Claims, 5 Drawing Sheets

(51) Int. Cl.
  *B60L 58/30* (2019.01)
  *H01M 10/48* (2006.01)
  *H01M 50/509* (2021.01)
  *H01M 50/519* (2021.01)
  *H01M 50/526* (2021.01)
  *H01M 50/569* (2021.01)
  *H02J 7/00* (2006.01)
  *B64D 27/24* (2006.01)

(52) U.S. Cl.
  CPC ....... *H01M 10/482* (2013.01); *H01M 10/486* (2013.01); *H01M 50/509* (2021.01); *H01M 50/519* (2021.01); *H01M 50/526* (2021.01); *H01M 50/569* (2021.01); *H02J 7/0047* (2013.01); *B60L 2200/10* (2013.01); *B64D 27/24* (2013.01); *H01M 2220/20* (2013.01)

(56) References Cited

U.S. PATENT DOCUMENTS

2015/0318724 A1* 11/2015 Brockman .......... H01M 10/482
                                                    320/152
2017/0054128 A1*  2/2017 Robert ................ H01M 10/486
2021/0325466 A1* 10/2021 Ruan .................... G01R 31/367

* cited by examiner

ELECTRICAL ENERGY STORAGE SYSTEM AND A VEHICLE COMPRISING SUCH AN ELECTRICAL ENERGY STORAGE SYSTEM

TECHNICAL FIELD

The disclosure herein relates to an electrical energy storage system and a vehicle comprising such an electrical energy storage system.

BACKGROUND

Energy storage devices for safety critical applications are known, for example, from EP 3 176 851 A1. Here, electrochemical energy storage cells having an elongated shape with a head region and a bottom region are used. The head region comprises a first and a second electrical terminal, while a cooling function is implemented mainly at the bottom region. Battery cell arrangements with serially connected groups of parallelly connected cells are contacted through a contacting device having a printed circuit board with openings, into which the head regions of the cells reach, to be contacted through metal tongues, which are connected to conductor tracks on the printed circuit board.

Temperature monitoring is an important factor for assessing the integrity of the energy storage device. The use of a plurality of individual temperature sensors for measuring the temperature of a plurality of storage cells requires a high integration effort.

SUMMARY

It is thus an object of the disclosure herein to disclose an alternative electrical energy storage device that is capable of monitoring the temperature of the individual energy storage cells reliably and with a minimum effort.

This object is met by an electrical energy storage system disclosed herein. Advantageous embodiments and further improvements may be gathered from the following description.

An electrical energy storage system is disclosed, comprising a plurality of electrochemical energy storage cells for collecting, supplying and storing electrical energy, a contacting device for contacting the energy storage cells, and a plurality of temperature sensors for monitoring the temperature of individual energy storage cells, wherein the electrochemical energy storage cells each comprise a first electrical terminal and a second electrical terminal, wherein the contacting device comprises conductors, wherein a first contacting element connects the first electrical terminal of each cell and a first conductor of the contacting device, and wherein a second contacting element connects the second electrical terminal of each cell and a second conductor of the contacting device, wherein the temperature sensors each comprise a thermocouple having a first element from a first metal material and a second element from a second metal material, and wherein the first element is directly connected to one of the terminals or the body of the energy storage cell and wherein the second element is directly connected to the first element or the body of the energy storage cell.

Electrochemical energy storage cells used in the electrical energy storage system may comprise an elongate, cylindrical shape. The storage cells may be arranged as a battery pack having a desired connection scheme, which may include serial and parallel connections. The cells may be held in a housing, on or at which the contacting device is arranged.

The energy storage cells may comprise a bottom side for heat dissipation and a head side, wherein the first and second terminals may be arranged in the region of the head side. This allows the contacting device to be designed in a very simple manner, which is capable of simply contacting both electrical terminals on the same side of an arrangement of a plurality of storage cells. The cooling system and the contacting of the cells may thus be spatially separated from each other. This principle is explained in EP 3 176 851 A1 in detail. Both terminals are connected through an individual contacting element, i.e. the first contacting element or the second contacting element, which reaches from the contacting device to the respective terminal. Such a contacting element is to be considered a part comprising a metal material that provides a connection between the respective terminal and a conductor of the contacting device.

However, instead of using cylindrical storage cells also other storage cells may be used, e.g. a system with pouch cells also be temperature monitored in this way with an additional connecting wire.

The plurality of temperature sensors allows to conduct individual cell monitoring in an interconnected cell network, which facilitates the monitoring of a full battery in particular for safety critical battery applications. A gist of the disclosure herein lies in using temperature sensors based on the thermocouple principle, wherein a part of each thermocouple is provided by the first contacting element or the body of the cell, and wherein a second part of the thermocouple is provided by a dedicated second element connected to the first contacting element or body of the cell.

The contacting device may comprise a multilayer arrangement, which may be realized in the form of a printed circuit board or another substrate or housing, on which conductors are arranged. The conductors may be realized by a conductor layer or separate wires. The contacting device may also be realized in the form of a laminated bus bar, into which dedicated conductors are integrated for use as a second element.

The contacting device may comprise a plurality of openings or recesses or it may simply be arranged above or next to the energy storage cells for contacting individual energy storage cells. It may be rigid or flexible. It may be arranged to be mechanically independent of the plurality of storage cells. For example, it may comprise a plurality of conductor tracks laminated into a flexible substrate. A plurality of single conductor branches may be provided to contact the storage cells. The contacting device may also comprise dedicated contact points, to which separate wires, i.e. the first and second contacting elements, may be welded.

The contacting device may be structured in a way that the contacting elements for contacting the electrical terminals protrude from the respective conductors over the above-mentioned openings if these are used. The contacting elements may protrude over other recesses or edges of the contacting device or simply protrude from a surface of the contacting device to the respective storage cells.

For example, the first element of a temperature sensor of a certain storage cell is provided by the first contacting element. The first contacting element protrudes from a conductor arranged on the contacting device to the respective first electrical terminal. The first contacting element may be made from copper. The second element may protrude or be laid over the first tongue. The second element may be welded onto the first contacting element. The welding spot may also connect the first contacting element to the first electrical terminal. Thus, the connection of the first electrical terminal and the first contacting elements well as the creation of a thermocouple comprising the first contacting element and the second element is combined.

To achieve the thermocouple principle, the second element is made from a second metal material, which differs from the first metal material. For instance, it may be made from a CuNi alloy. The original conductor track for transferring the battery power thus acts as one metal of a pair of materials to form a thermocouple. When combining copper (Cu) and constantan (CuNi), a thermocouple known and standardized as Type T can be formed. Other material combinations of metals are also possible in principle.

When making contact, in particular by welding, the second element is preferably welded on at the same time, such that there is no need for any assembly work for individual temperature measurement. This enables cost-effective individual cell monitoring. In addition, the temperature measurement is very reliable, since no external temperature sensor is attached and wired, but the metallization of the circuit board of the contacting device or another suitable structure is used. It also ensures that the temperature is measured directly on the cell. If the second element were to peel off, the circuit for measuring the thermal voltage would be interrupted and an error could be detected immediately. With a different measuring method, for example attaching a Pt100 (resistance-based), the sensor could become detached and thus may still provide a (wrongly) measured temperature, but it cannot be determined if the electrical contacting of the sensor is still intact. The principle shown herein thus enables a self-test capability. Another advantage lies on providing a very precise measurement directly on the cell with fast response time.

In an advantageous embodiment, the contacting device comprises a plurality of openings, wherein the head sides of the energy storage cells are disposed in individual openings of the contacting device, and wherein the first contacting element in the form of a first tongue and the second contacting element in the form of a second tongue reach above the openings. Thus, the contacting device may connect a plurality of storage cells by simply arranging the contacting device on head sides of all storage cells.

In an advantageous embodiment, the first element is realized by one of the first contacting element and the second contacting element, wherein the second element is directly attached to the first element. As explained above, the respective contacting element, i.e. the first element, may be made from copper and is used for transferring electrical power from or into the respective cell. It is dimensioned to safely achieve its function throughout its lifetime. It may thus comprise a clearly larger cross-sectional surface than the second element. The second element may be attached to the first element directly where the first element is attached to the respective electrical terminal.

The first element may be sandwiched between the respective electrical terminal and the second element directly on the respective electrical terminal. Hence, the second element overlaps the first element. Both elements may be welded onto the respective electrical terminal in a single step. The order of the first and second element may also be changed, such that the second element is closer to the respective electrical terminal than the current-leading first element.

The first element and the second element may be attached to the body of the energy storage cell in a distance to each other, wherein the body of the energy storage cell may be electrically conductive and constitutes a third element of the temperature sensor made from a third metal material. It may be feasible that a part of the body constitutes the second electrical terminal. However, the body may be made from steel or aluminum. The first element and the second element may be made from other metal materials. Thus, two thermocouple are created, leading to two thermal voltages connected in series and dependent on the cell temperature. This allows a simple manufacturing of the contacting device, e.g. a printed circuit board, as well as the welded connections.

As mentioned above, the body may also comprise the second electrical terminal. The first electrical terminal may comprise a protrusion that protrudes from the head side of the storage cell. The second terminal may surround the first terminal in the form of a ring, which is arranged on the head side, too. However, it may also be placed in a region of a circumferential surface of the storage cell directly adjacent the head side. The contacting device may thus be arranged in the direct vicinity of the head sides of the storage cells and an additional contacting device just for contacting the second electrical terminals is not required.

In an advantageous embodiment, the energy storage cells comprise a plurality of groups, each of the groups having a multitude of energy storage cells, wherein the groups are interconnected in a serial connection, wherein the multitude of energy storage cells inside the groups are interconnected in a parallel connection, and wherein one measuring module is provided for each group and is connected to temperature sensors of the respective group. In most cases, battery systems for greater electrical power consist of a serial and parallel connection of individual cells. A network within a battery module is formed, for example, from 10 cells connected in parallel, which are then connected 14-times in series. The interconnection in the example is usually designated with the notation 10P14S or 14S10P. Due to its principle, the arrangement of temperature sensors described above cannot be implemented in a potential-free manner and a maximum permissible insulation voltage of the measuring module should be taken into account. It is conceivable to use one measuring module for each group, as a number of cells are connected in parallel and thus comprise the same electrical potential. Hence, the temperature sensors of one group may advantageously be connected to a single measuring module, which may be realized in the form of a multi-channel evaluation electronics unit.

In a further advantageous embodiment, each measuring module comprises a signal coupler, and wherein the signal couplers of a plurality of measuring modules are connected to an evaluation or readout unit. Preferably, only a single integrated circuit per voltage level, i.e. per group of the storage cells, is used. The signal couplers are provided for isolated signal coupling. In an exemplary simple case, the signal may transmit a group error in temperature monitoring or specific measured values in the form of a bus-based signal. Otherwise also individual cell temperature values can be transmitted via a bus-based signal.

In an advantageous embodiment, the contacting device comprises at least one printed circuit board, wherein the conductors are realized in the form of at least one conducting layer on at least one insulation layer. The contacting device may thus have a very simple and compact design.

The contacting device may comprise a printed circuit board for each group, wherein the measuring module may comprise an SMD component attached to or integrated into the respective printed circuit board. The use of small, integrated SMD electronic components may be possible and only requires very little space on the circuit board. A light and robust single cell monitoring can thus be implemented cost-effectively.

Furthermore, the measuring modules may directly be connected to the respective second elements of the temperature sensors through individual conductors and to the common electric potential of all first elements. This allows to reduce the effort for connecting the temperature sensors to the measuring module. It also provides a reliable and simple way to provide a self-test functionality through the use of a common potential.

The second element may be realized by an electrically insulating substrate having a coating of the second metal material. The substrate may be provided directly on the first element. However, it is also conceivable to use a separate substrate, e.g. a plastic foil, onto which the second metal material is provided as a coating.

The first metal material and the second metal are distinct and selected from a group of materials, the group comprising
copper (Cu),
CuNi alloys,
iron (Fe),
steel,
aluminum,
cer (Ce),
NiCr alloys, and
PtRh alloys.

It may be advantageous if the first metal material is copper (Cu), while the second metal material is CuNi.

The electrical energy storage system may be configured to conducting a self-test by checking a connecting state between the first elements and the respective second elements, or by evaluating a connecting state between the first element and the respective electrical terminal, or by comparing a temporal behavior of measured temperatures of at least a part of all temperature sensors to identify implausible results from a detached temperature sensor. For example, if the second element should detach, a measuring circuit would be interrupted. A temperature measurement will then not be possible and this fault can be detected immediately.

If both the first element and the second element become detached, but are still connected to each other, this would not be recognized by a measuring circuit. However, if the first element is the first contacting element or the second contacting element connected to an electrical terminal of the storage cell, electrical power transfer would be interrupted, which is immediately detectable. This can be used to detect that the temperature measurement signal for this particular cell does not correspond to a cell wall temperature. This principle may be difficult to apply to an arrangement of several cells connected in parallel. However, this cell would then no longer be electrically loaded in the storage system and corresponds to a cell in the state of storage. Spontaneous thermal runaway is thus extremely unlikely.

Both elements being detached from the storage cell leads to a very low heat capacity, as the thermal mass of the respective storage cell is no longer coupled to the temperature measuring point. As a result, the respective temperature sensor reacts more quickly to temperature changes, such as in the case of load during charging/discharging or changes in the ambient temperature, than the temperature sensors attached to other cells or a reference sensor. This effect may be evaluated in order to detect and localize whether a cell may have lost electrical contact even with parallel connections. This evaluation may be conducted by the evaluation unit mentioned above, a measuring module or another external device that receives temperature signals from the temperature sensors.

While the contacting device may be based on a rigid or flexible printed circuit board, it may be applied to similarly designed housings or carriers of battery cells by applying one or more conductive layers separated by an insulator.

The disclosure herein further relates to a vehicle comprising an electrical energy storage system according to the above description. The vehicle may be a car, a truck, a boat, a ship, an aircraft, a helicopter, a subsea-vehicle, or a space vehicle.

For the purpose of electrical shielding, further metal materials in the form of coatings may be provided, while underneath coatings a further insulation may be arranged.

BRIEF DESCRIPTION OF THE DRAWINGS

In the following, the attached drawings are used to illustrate example embodiments in more detail. The illustrations are schematic and not to scale. Identical reference numerals refer to identical or similar elements.

DETAILED DESCRIPTION

Figure 1:
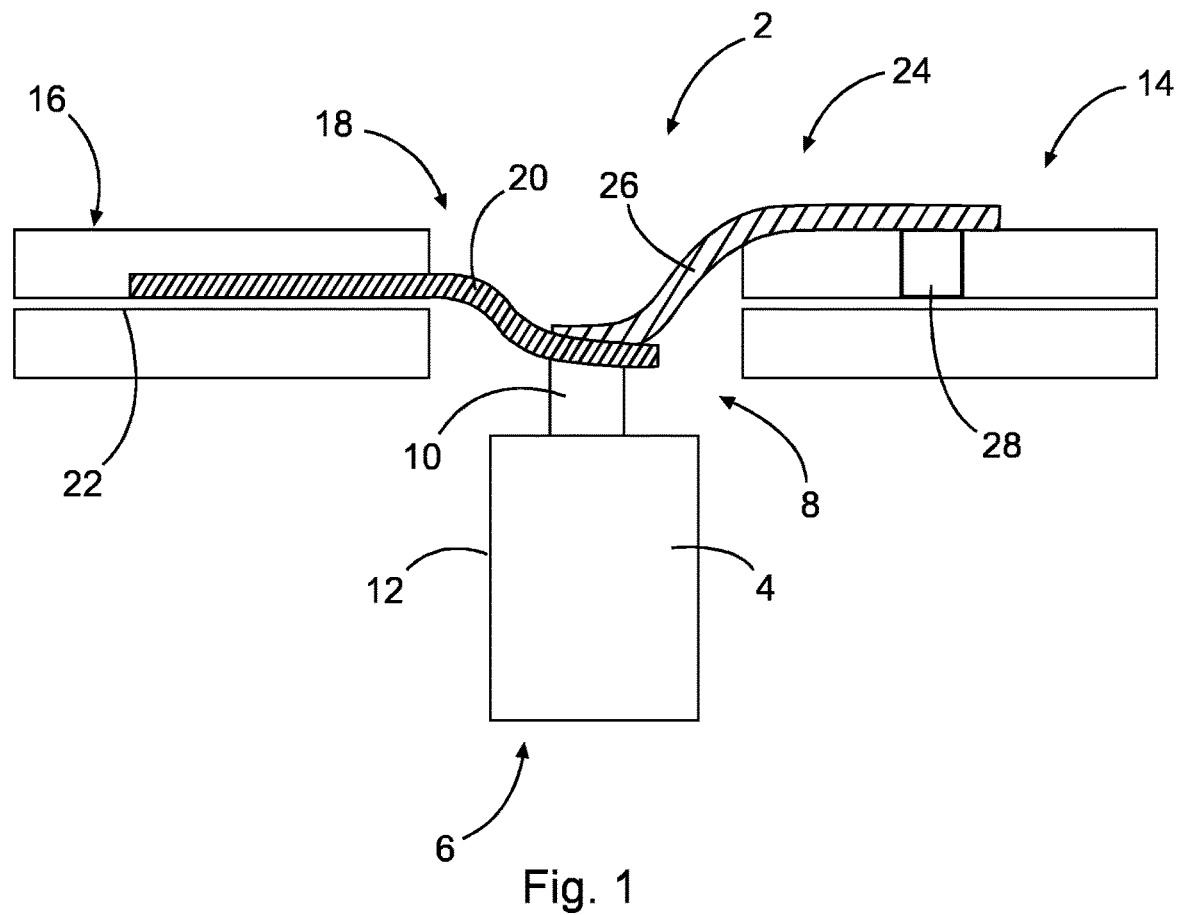
FIG. 1 shows a part of a contacting device with a temperature sensor in a sectional view.

FIG. 1 shows a part of an electrical storage system 2 in a sectional view. Here, one of a plurality of interconnected electrochemical storage cells 4 is shown, having a bottom side 6 and a head side 8. On the head site 8, a first electrical terminal 10 is placed. Exemplarily, it protrudes from a substantially cylindrical housing 12. A contacting device 14 is provided, above the head side 8 and comprises a printed circuit board 16 having an opening 18, into which the head side 8 of the storage cell 4 protrudes. A first contacting element in the form of a first tongue 20, which is attached to a conductor track 22 of the printed circuit board 16, is connected to the first electrical terminal 10. A second contacting element in the form of a second tongue is connected to a second electrical terminal, both of which are not shown in FIG. 1.

A temperature sensor 24 is provided, which comprises a second element 26 that is connected to a through-contact 28, which in turn is coupled with a measuring module 29 explained further below. The second element 26 reaches above the opening 18, overlaps with the first tongue 20 and is attached to an end of the first tongue 20 directly above the first electrical terminal 10. The first tongue 20 is realized from copper, while the second element 26 comprises a CuNi alloy. Consequently, the first tongue 20 and the second element 26 constitute a thermocouple, which generates a thermoelectric voltage directly depending on the temperature of the joint above the first electrical terminal 10. Thus, the first tongue 20 is a first element of the thermocouple. The design of the temperature sensor 24 is thus very simple and only requires the second element 26 and the measuring module 29, which is connected to both the first element, i.e. the first tongue 20, and the second element 26.

The connection of both the first element 20 and the second element 26 can be done in a single step when connecting the first element, i.e. the first tongue 20, to the first electrical terminal 10 through welding. Thus, the effort for providing a plurality of temperature sensors on the contacting device 14 is clearly reduced.

Figure 2:
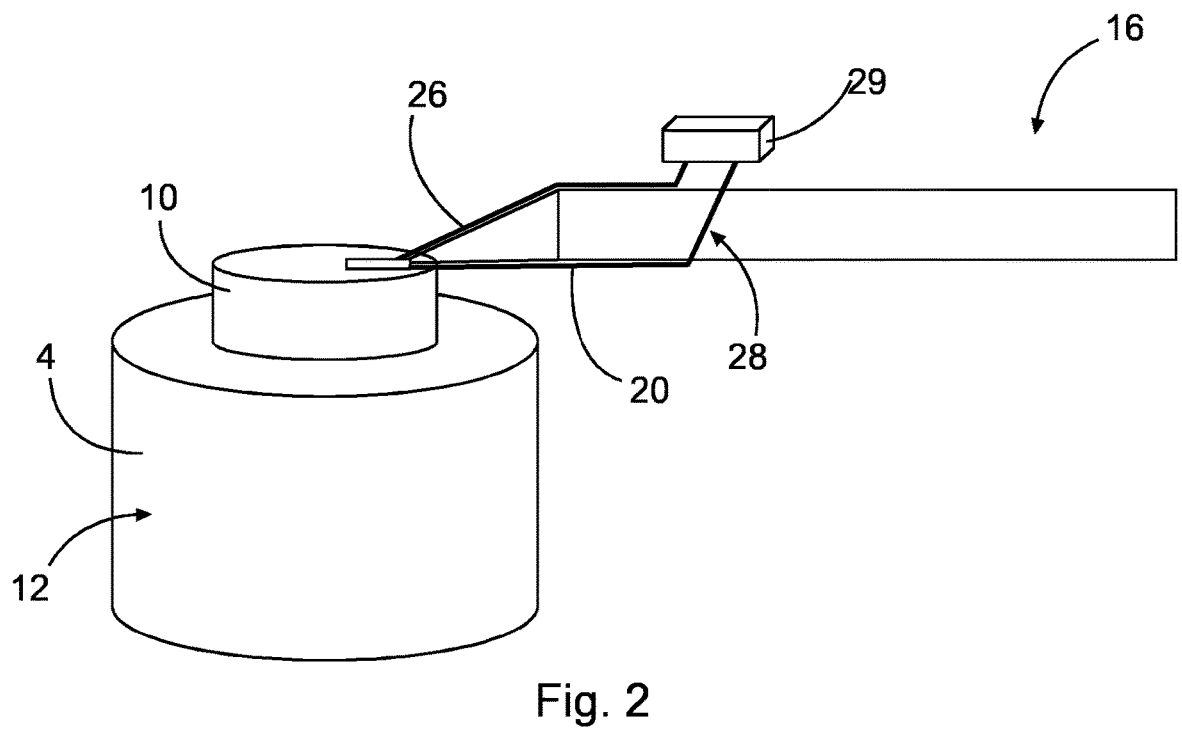
FIG. 2 shows the part of the contacting device in another view.

FIG. 2 shows the arrangement of the storage cell and the temperature sensor 24 in a different view. The measuring module 29 may comprise an integrated circuit and may be connected to further temperature sensors 24 as shown in FIG. 4.

Figure 3:
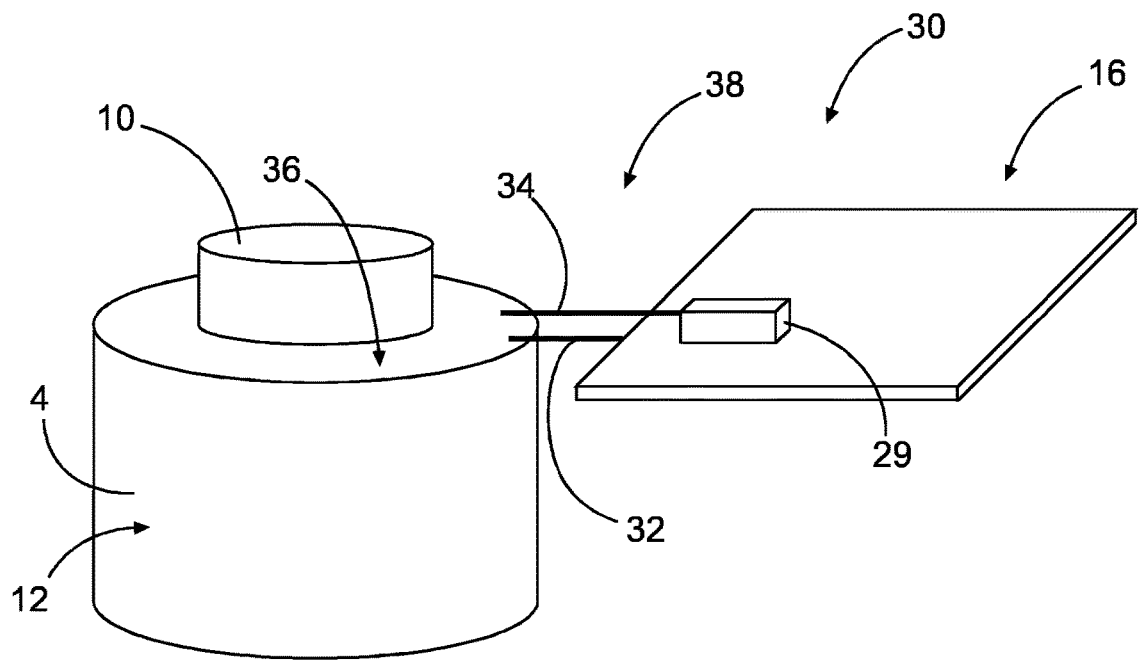
FIG. 3 shows a part of the contacting device with another temperature sensor.

FIG. 3 shows a modified system 30, where a first element 32 and a second element 34 are attached to an upper surface 36 of the storage cell 4, wherein free ends of the first element 32 and of the second element 34 are arranged in a distance to each other. The first element 32 may be made from copper, while the second element 34 may comprise CuNi. The housing 12 of the storage cell 4 may in turn be made from aluminum or steel. The housing 12 thus creates a thermocouple pair with each of the first element 32 and the second element 34 and consequently, a kind of three-material thermocouple temperature sensor 38 is created.

The region, where the ends of the first element 32 and the second element 34 are placed, may comprise the second electrical terminal. Thus, the first element 32 or the second element 34 may also be the first tongue 20 or a second tongue.

Figure 4:
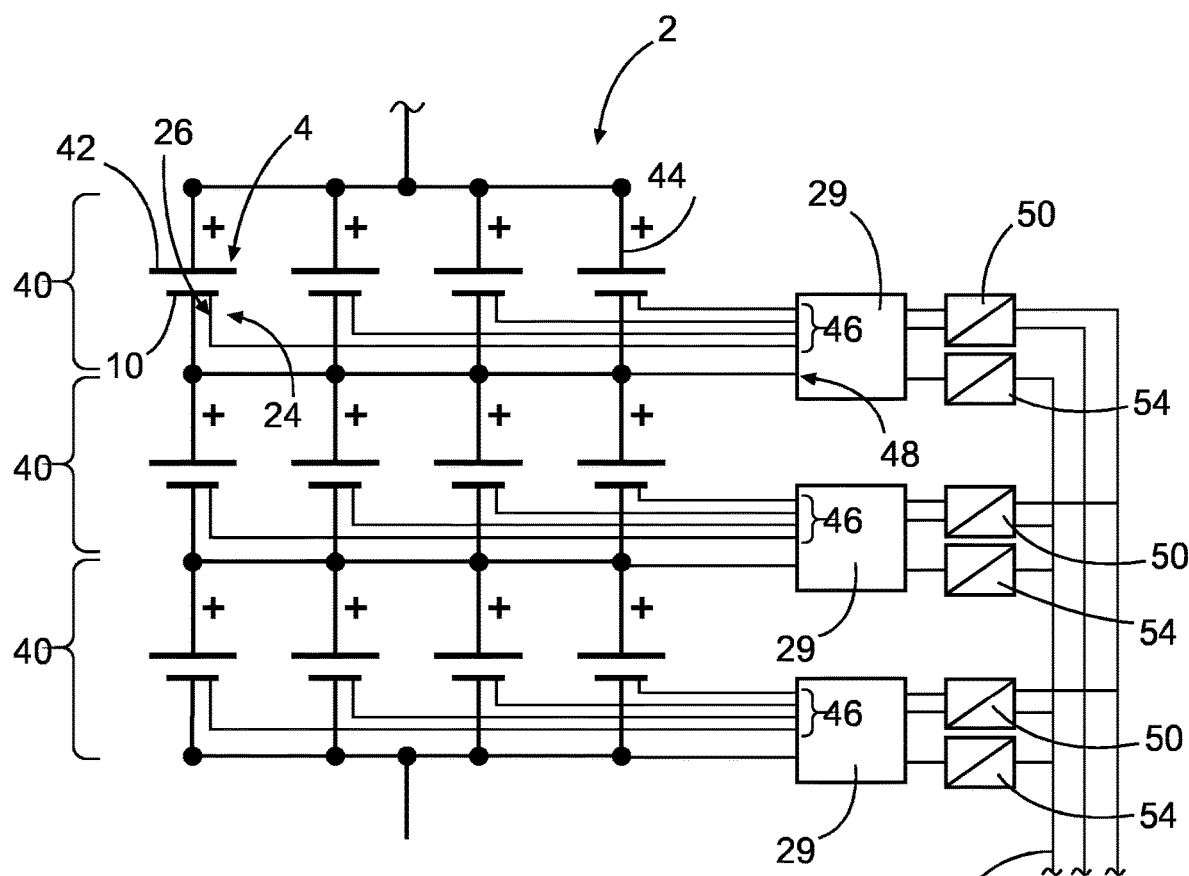
FIG. 4 shows an electrical energy storage device in a wiring diagram.

FIG. 4 shows the system 2 in the form of a wiring diagram. Here, three groups 40 of storage cells 4 are connected in a serial connection. Inside each of the groups 40, four storage cells 4 are connected in parallel to each other. Temperature sensors 24 are provided by combining a second element 26 and a first tongue 20, which are attached to a first electrical terminal 10, as shown in FIG. 1. Here, the first electrical terminal 10 is a negative pole of the respective storage cell 4.

A second electrical terminal 42, which represents a positive pole of the respective cell 4, is connected to a second tongue 44. The second element 24 of each storage cell 4 of each group 40 is connected to a measuring module 29 through one of a plurality of inputs 46. A common potential of the storage cells 4 of each group 40 is connected to a common potential input 48 of the measuring module. Hence, only single inputs are required for measuring each individual temperatures.

The measuring module 29 is supplied with an operating voltage through a supply unit 50. Each group 40 comprises a single measuring module 29, which is connected to all temperature sensors 24 of the respective storage cells 4. Consequently, three measuring modules 29 are provided for measuring the temperatures of twelve storage cells 4.

A common signal line 52 is provided for coupling in measurement signals representing the individual temperatures through signal couplers 54. For example, the common signal line 52 delivers a modulated bus or network signal comprising information of all temperature sensors 24.

Figure 5:
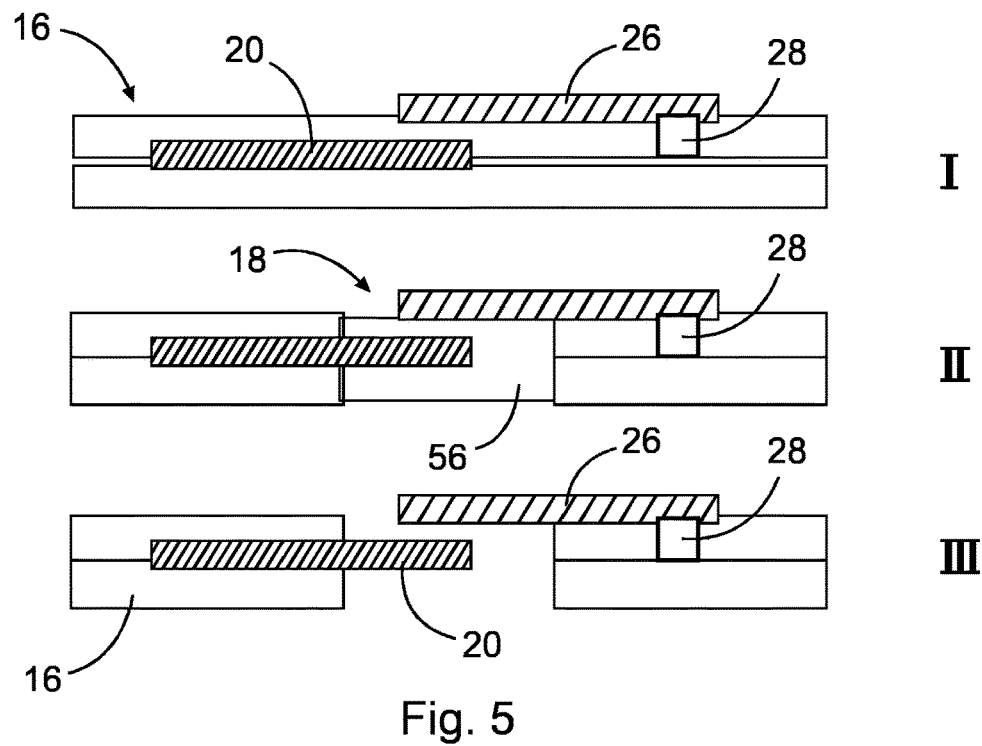
FIGS. 5-7 show manufacturing of a contacting device.

FIG. 5 shows an example for manufacturing a part of the contacting device 14 for integrating the temperature sensors 24. Here, the multilayer printed circuit board 16 is provided, into which the first tongue 20 and the second element 26 are integrated through a local metallization, as indicated in partial figure I. In the second partial figure II, the opening 18 is created, e.g. by a laser, to locally remove the material of the printed circuit board 16, which may be a plastic material. Residual glass fibers 56 are then removed afterwards. As a result, the arrangement shown in partial figure III is created. The first tongue 20 and the second element 26 may then be connected to the respective storage cell 4 as shown in FIG. 1.

Figure 6:
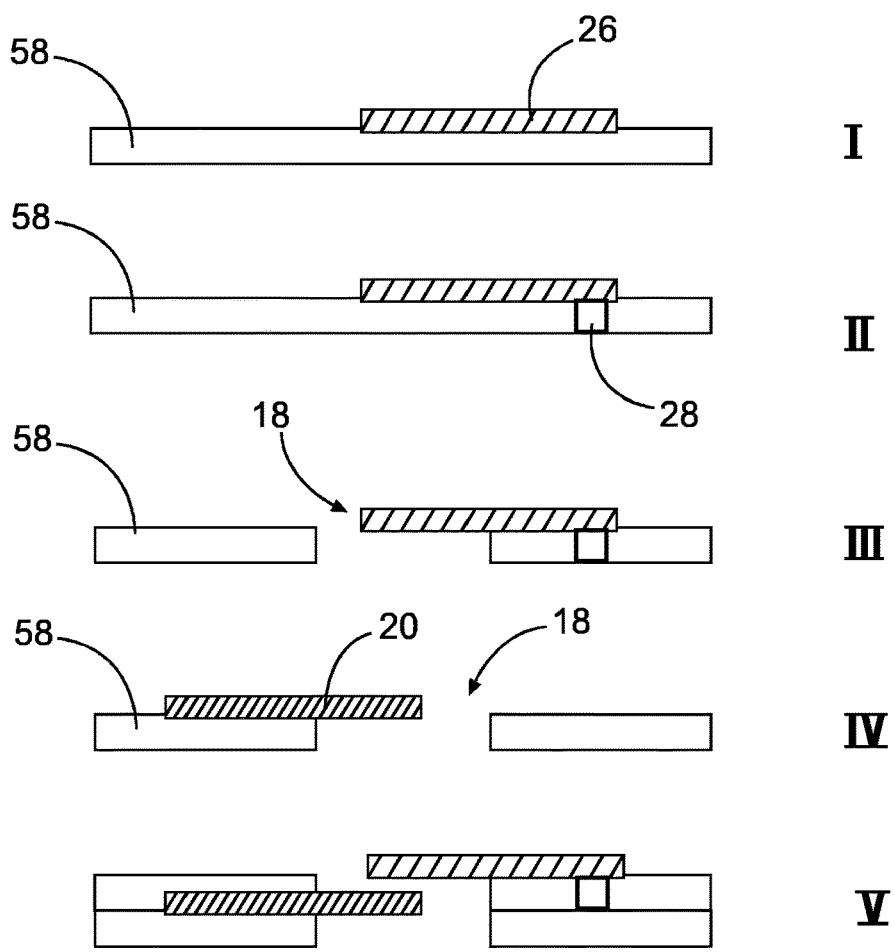

FIG. 6 shows an alternative way of manufacturing a part of the contacting device 14. First partial figure I shows a carrier film 58 being locally metallized to form the second element 26. In the partial figure II, through-contacts 28 to the second element 26 are provided. In partial figure III, an opening 18 is provided into the carrier film 58, in analogy to partial figure II of FIG. 5. Still further, the first tongue 20 overlapping the opening 18 is provided in partial figure IV. Afterwards, both sections from partial figures III and IV are laminated onto each other.

Figure 7:
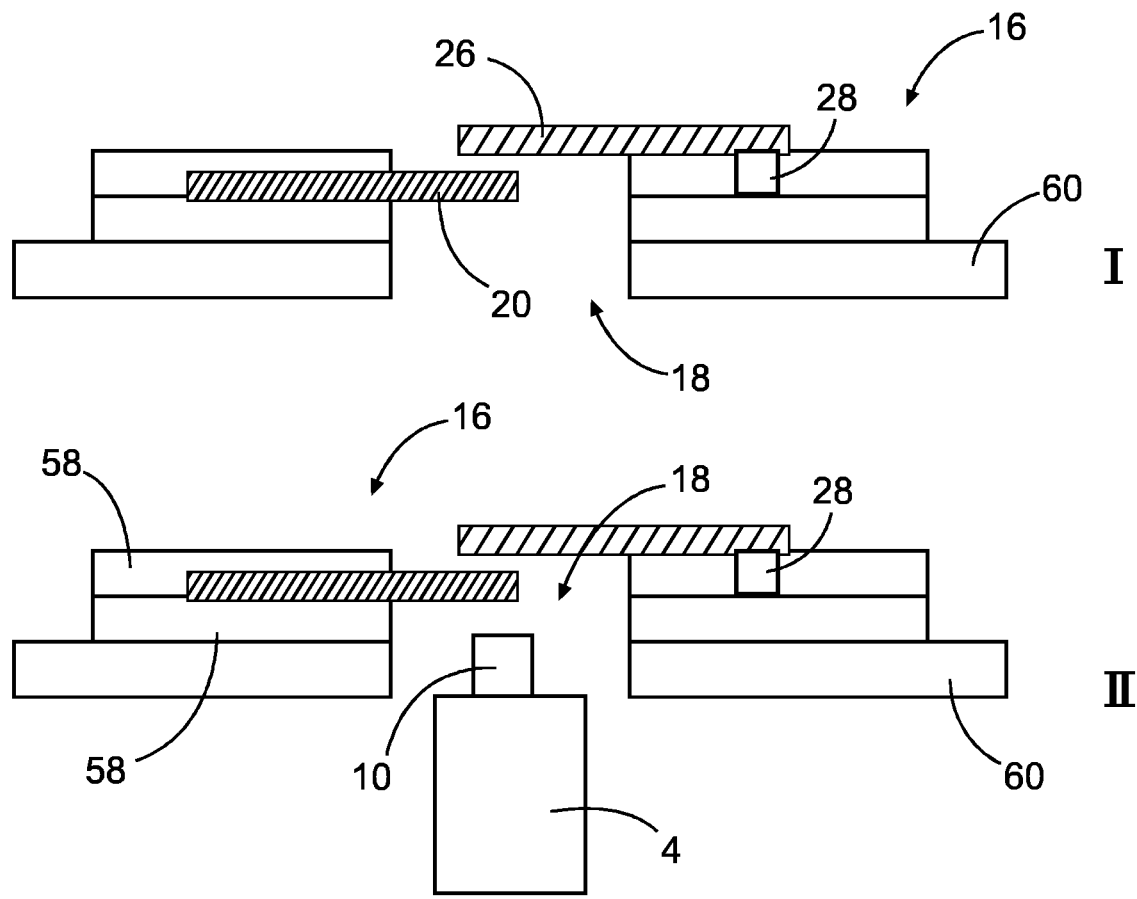

If required, this arrangement may be attached to a mechanical carrier 60 as shown in partial figure I of FIG. 7. As depicted in partial figure II the storage cell 4 will then be assembled as shown in FIG. 1.

Figure 8:
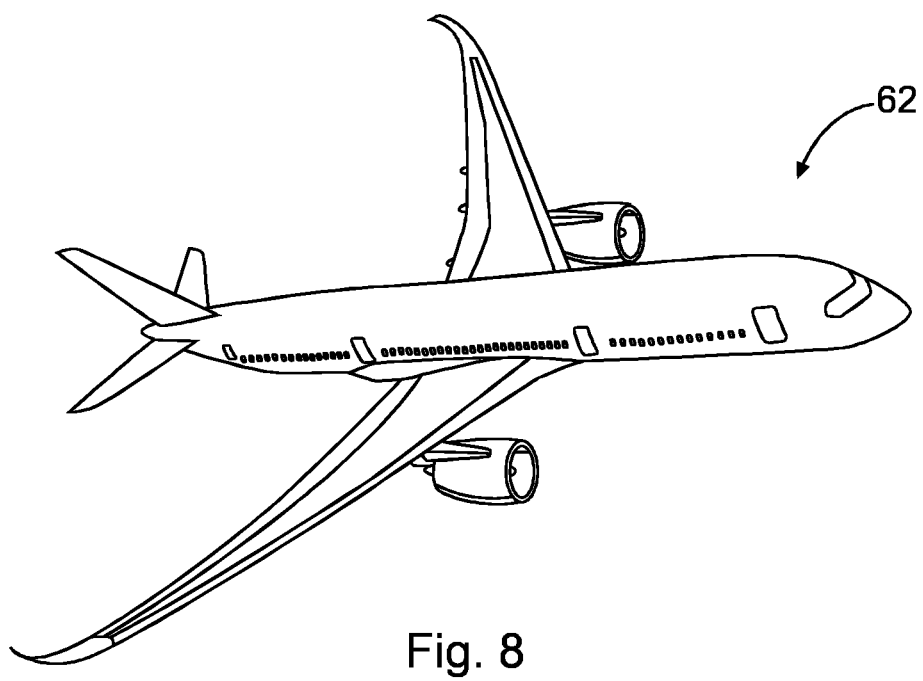
FIG. 8 shows an aircraft.

FIG. 8 shows an aircraft 62, into which an electrical energy storage system 2 is integrated.

Figure 9:
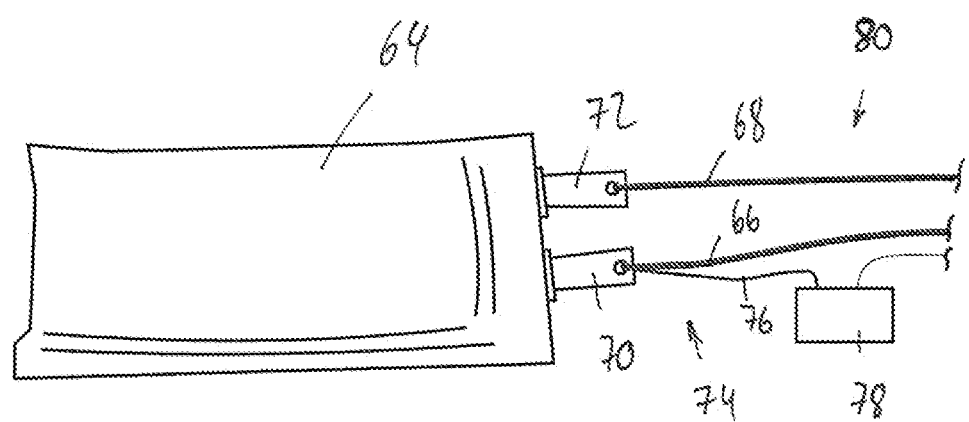
FIG. 9 shows a pouch-type storage cell.

FIG. 9 shows an energy storage cell 64 in the form of a pouch. Here, a first contacting element 66 and a second contacting element 68 are connected to a first electrical terminal 70 and a second electrical terminal 72. The electrical terminals 70 and 72 are provided in the form of tabs made from a metal material and are usually thermally well coupled with the interior.

The first contacting device 66 constitutes the first element of a thermocouple-based temperature sensor 74, while a separate second element 76 is connected to the first contacting device 66 directly on the first electrical terminal 70. A measuring module 78 is connected to the second element 76 and a power source (not shown). It is conceivable that a pack having a plurality of these storage cells 64 is equipped with a plurality of temperature sensors 74. For contacting the cells 64, a contacting device 80 is used, which may simply include a set of conductors in the form of the first and second contacting elements as well as individual second elements 76 branching off a laminated bus bar or similar.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 electrical storage system
4 electrochemical storage cell
6 bottom side
8 head side
10 first electrical terminal
12 housing/body
14 contacting device
16 circuit board
18 opening
20 first contacting element/first tongue/first element
22 conductor track
24 temperature sensor
26 second element 28 through-contact
29 measuring module
30 electrical storage system
32 first element
34 second element
36 upper surface
38 temperature sensor
40 group
42 second electrical terminal
44 second contacting element/second tongue
46 input
48 common potential input
50 supply unit
52 common signal line
54 signal coupler
56 residual glass fiber
58 carrier film
60 mechanical carrier
62 aircraft
64 storage cell
66 first contacting element/first element
68 second contacting element
70 first electrical terminal
72 second electrical terminal
74 temperature sensor
76 second element
78 measuring module
80 contacting device

The invention claimed is:

1. An electrical energy storage system, comprising:
a plurality of electrochemical energy storage cells for collecting, supplying, and storing electrical energy;
a contacting device for contacting the energy storage cells; and
a plurality of temperature sensors for monitoring a temperature of individual energy storage cells;
wherein the electrochemical energy storage cells each comprise a first electrical terminal and a second electrical terminal;
wherein the contacting device comprises conductors;
wherein a first contacting element connects the first electrical terminal of each cell and a first conductor of the contacting device, and wherein a second contacting element connects the second electrical terminal of each cell and a second conductor of the contacting device;
wherein the temperature sensors each comprise a thermocouple having a first element from a first metal material and a second element from a second metal material;
wherein the first element is directly connected to one of the terminals or a body of the energy storage cell and wherein the second element is directly connected to the first element or the body of the energy storage cell;
wherein the first element and the second element are attached to the body of the energy storage cell in a distance to each other; and
wherein the body of the energy storage cell is electrically conductive and constitutes a third element of the temperature sensor made from a third metal material.

2. The electrical energy storage system according to claim 1, wherein:
the contacting device comprises a plurality of openings;
head sides of the energy storage cells are disposed in individual openings of the contacting device; and
the first contacting element and the second contacting element reach above the openings.

3. The electrical energy storage system according to claim 2, wherein:
the contacting device comprises at least one printed circuit board; and
the conductors comprise at least one conducting layer on at least one insulation layer.

4. The electrical energy storage system according to claim 1, wherein:
the first element is realized by one of the first contacting element and the second contacting element; and
the second element is directly attached to the first element.

5. The electrical energy storage system according to claim 4, wherein the first element is sandwiched between a respective electrical terminal and the second element directly on the respective electrical terminal.

6. The electrical energy storage system according to claim 1, wherein the body comprises the second electrical terminal.

7. The electrical energy storage system according to claim 6, wherein:
the energy storage cells comprise a plurality of groups, each of the groups having a multitude of energy storage cells;
the groups are interconnected in a serial connection;
the energy storage cells inside the groups are interconnected in a parallel connection; and
one measuring module is provided for each group and is connected to temperature sensors of a respective group.

8. The electrical energy storage system according to claim 7, wherein:
each measuring module comprises a signal coupler; and
the signal couplers of a plurality of measuring modules are connected to an evaluation unit or readout unit.

9. The electrical energy storage system according to claim 7, wherein:
the contacting device comprises at least one printed circuit board;
the conductors comprise at least one conducting layer on at least one insulation layer;
the contacting device comprises a printed circuit board for each group; and
the measuring module comprises an SMD component attached to or integrated into the respective printed circuit board.

10. The electrical energy storage system according to claim 6, wherein the measuring modules are directly connected to respective second elements of the temperature sensors through individual conductors and to a common electric potential of all first elements.

11. The electrical energy storage system according to claim 1, wherein the second element comprises an electrically insulating substrate having a coating of the second metal material.

12. The electrical energy storage system according to claim 1, wherein the first metal material and the second metal are distinct and selected from a group of materials consisting of copper (Cu), CuNi alloys, iron (Fe), steel, aluminum, cerium (Ce), NiCr alloys, and PtRh alloys.

13. The electrical energy storage system according to claim 1, wherein the electrical energy storage system is configured to conduct a self-test by:
checking a connecting state between the first elements and respective second elements; or
by evaluating a connecting state between the first element and a respective electrical terminal; or
by comparing a temporal behavior of measured temperatures of at least a part of all temperature sensors to identify implausible results from a detached temperature sensor.

14. A vehicle comprising the electrical energy storage system according to claim 1.

\* \* \* \* \*